(12) United States Patent
Sakai

(10) Patent No.: US 8,236,096 B2
(45) Date of Patent: *Aug. 7, 2012

(54) INK SET FOR INKJET RECORDING

(75) Inventor: Minoru Sakai, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 1 day.

This patent is subject to a terminal disclaimer.

(21) Appl. No.: 12/723,910

(22) Filed: Mar. 15, 2010

(65) Prior Publication Data

US 2010/0236447 A1    Sep. 23, 2010

(30) Foreign Application Priority Data

Mar. 18, 2009  (JP) .................. 2009-066605

(51) Int. Cl.
*C09D 11/02* (2006.01)
(52) U.S. Cl. .................................... 106/31.6
(58) Field of Classification Search .............. 106/31.6
See application file for complete search history.

(56) References Cited

U.S. PATENT DOCUMENTS

| | | |
|---|---|---|
| 2006/0023042 A1 | 2/2006 | Doi |
| 2006/0197814 A1* | 9/2006 | Doi .......................... 347/100 |
| 2008/0280044 A1* | 11/2008 | Okamura et al. ............ 427/258 |
| 2009/0246382 A1 | 10/2009 | Hirato et al. |
| 2010/0236447 A1 | 9/2010 | Sakai |

FOREIGN PATENT DOCUMENTS

| | | |
|---|---|---|
| JP | 2004-10833 A | 1/2004 |
| JP | 2005-74654 A | 3/2005 |
| JP | 2007-331171 A | 12/2007 |

OTHER PUBLICATIONS

Non-Final Office Action dated Feb. 29, 2012 issued in copending U.S. Appl. No. 12/540,386.

* cited by examiner

*Primary Examiner* — Melvin C Mayes
*Assistant Examiner* — Veronica F Faison
(74) *Attorney, Agent, or Firm* — Birch, Stewart, Kolasch & Birch, LLP

(57) ABSTRACT

The ink set for inkjet recording of the invention has at least: an aqueous ink composition containing at least a pigment; and a reaction liquid containing at least a reactant that produces an aggregate when contacted with the aqueous ink composition. The static surface tension of the reaction liquid is 40 mN/m or higher. The dynamic surface tension $\gamma 0.1$ is from 40 mN/m to 50 mN/m and the ratio $\gamma 0.1/\gamma 10$, that is a ratio of the dynamic surface tension and is sometimes referred to as $\gamma$, is from 1.01 to 1.10, in which the dynamic surface tension of the reaction liquid at a surface lifetime of 100 ms and 10000 ms is $\gamma 0.1$ and $\gamma 10$, respectively, according to the maximum bubble pressure technique. The aqueous ink composition aggregates by contacting the reaction liquid to form an image.

6 Claims, No Drawings

INK SET FOR INKJET RECORDING

CROSS-REFERENCE TO RELATED APPLICATION

This Application claims priority under 35 USC 119 from Japanese Patent Application No. 2009-66605 filed on Mar. 18, 2009, the disclosure of which is incorporated by reference herein.

BACKGROUND OF THE INVENTION

1. Field of Invention

The invention relates to an ink set for inkjet recording.

2. Description of the Related Art

Inkjet recording performs recording by jetting ink droplets from each of a number of nozzles formed on an inkjet head. The method is widely used because the noise during a recording operation is low, running costs are low, and a high quality image can be recorded on a wide variety of recording media.

A two-liquid reaction process is known as one employable an inkjet recording method. The two-liquid reaction process involves reacting an ink and a reaction liquid which coagulates the ink with each other so as to coagulate the ink and thus accelerate ink fixation.

Examples of the inkjet recording method using the two-liquid reaction process include an inkjet recording method described in JP-A No. 2005-74654. In this method, the surface tension of a reaction liquid containing a zirconium salt and an ammonium salt is set to be higher than the average value of the surface tensions of aqueous pigment inks used in combination with the reaction liquid, the surface tension of the reaction liquid is from 25 to 50 mN/m, the surface tensions of the inks are from 20 to 50 mN/m, and the difference between the surface tension of the reaction liquid and the average of the surface tensions of the inks is in a range of from 5 to 25 mN/m. This inkjet recording method is taught as providing high image density and excellent rub-fastness without bleedings.

Examples of the inkjet recording method using the two-liquid reaction process further include an image forming method described in JP-A No. 2007-331171. This method includes a process of forming a film of an aggregate on the surface of a reaction liquid existing in liquid form, the aggregate film being formed by aggregation of a pigment aggregate generated by ejecting an ink having low surface tension onto a reaction liquid having high surface tension and contacting the ink with the reaction liquid, and in which inks are applied in order of decreasing surface tension.

Conventionally, with a two-liquid ink set for inkjet recording using an ink composition and a reaction liquid, an image is obtained by coagulating the ink using the reaction liquid. It is necessary to evenly apply the reaction liquid to the recording medium as a single liquid before the ink is applied to the recording medium. Further, it is desirable that the applied reaction liquid functions effectively and without waste with respect to coagulation of the ink. Coating of a reaction liquid on a recording medium is performed such that the coating liquid is applied to the recording medium to a thickness of from one to several microns; however, it is difficult to form a uniform image because of problems such as the occurrence of reticulated irregularities when the liquid is coated on the recording medium from a coating roller or penetration of the coated reaction liquid into the base layer of the paper, as a result of which the reactant included in the reaction liquid does not function sufficiently as a coagulant.

SUMMARY OF THE INVENTION

The methods described in JP-A Nos. 2005-74654 and 2007-331171 may not provide recorded images having sufficient uniformity.

The present invention has been made in view of the above circumstances and provides an ink set for inkjet recording which can provide recorded images having excellent image uniformity.

One aspect of the present invention is an ink set for inkjet recording comprising: an aqueous ink composition comprising a pigment; and a reaction liquid comprising a reactant that produces an aggregate when contacted with the aqueous ink composition, the static surface tension of the reaction liquid being 40 mN/m or higher, and the dynamic surface tension $\gamma 0.1$ being from 40 mN/m to 50 mN/m and the ratio $\gamma 0.1/\gamma 10$ being from 1.01 to 1.10, in which the dynamic surface tension of the reaction liquid at a surface lifetime of 100 ms and 10000 ms is $\gamma 0.1$ and $\gamma 10$, respectively, according to the maximum bubble pressure technique.

DETAILED DESCRIPTION OF THE INVENTION

The ink set for inkjet recording of the invention has at least: an aqueous ink composition containing at least a pigment; and a reaction liquid containing at least a reactant that produces an aggregate when contacted with the aqueous ink composition. The static surface tension of the reaction liquid is 40 mN/m or higher. The dynamic surface tension $\gamma 0.1$ is from 40 mN/m to 50 mN/m and the ratio $\gamma 0.1/\gamma 10$, that is a ratio of the dynamic surface tension and is sometimes referred to as $\gamma$, is from 1.01 to 1.10, in which the dynamic surface tension of the reaction liquid at a surface lifetime of 100 ms and 10000 ms is $\gamma 0.1$ and $\gamma 10$, respectively, according to the maximum bubble pressure technique. The aqueous ink composition aggregates by contacting the reaction liquid to form an image.

The ink set for inkjet recording of the invention may have one or more aqueous ink composition(s) and one or more reaction liquid(s). In preferable embodiments, the ink set may have plural aqueous ink compositions.

The configuration of the ink set of the invention having the reaction liquid with the static surface tension, the dynamic surface tension $\gamma 0.1$ and the ratio $\gamma 0.1/\gamma 10$ which are within the specified ranges may suppress the occurrence of reticulated irregularities and may improve aggregation property of the ink to provide images having higher uniformity.

Ink Composition

The ink composition employed in the invention contains at least one pigment, and may further contain polymer particles, a hydrophilic organic solvent, a surfactant, water, additives and/or the like.

Pigment

The ink composition employed in the invention contains at least one pigment. Any conventionally-known pigments may be used as the pigment in the invention without particular limitation.

Examples of the pigment include a water-insoluble pigment itself and a water-insoluble pigment which is subjected to surface treatment with a dispersant.

The "water-insoluble pigment" refers to a colorant that is almost completely insoluble or hardly soluble in water, and specifically refers to such a colorant that the amount of the colorant soluble in water at 25° C. is not more than 0.5 mass % of the water.

The type of the pigment is not particularly limited, and known organic pigments and known inorganic pigments may be used. Examples of the pigment include polycyclic pigments such as an azo lake, an azo pigment, a phthalocyanine pigment, a perylene pigment, a perynone pigment, an anthraquinone pigment, a quinacridone pigment, a dioxadine pigment, a diketopyrrolopyrrole pigment, a thioindigo pigment, an isoindolinone pigment and a quinophthalone pigment; dye lakes such as basic dye lakes and acidic dye lakes; organic pigments such as a nitro pigment, a nitroso pigment, aniline black and a daylight fluorescent pigment; and inorganic pigments such as titanium oxide, iron oxide and carbon black. Pigments that can be dispersed in an aqueous phase may be used even if they are not described in the Color Index. Further examples of usable pigments include: pigments obtained by subjecting the above-described pigments to surface treatment with a surfactant, a polymer dispersant or the like; and grafted carbon.

Among these pigments, an azo pigment, a phthalocyanine pigment, an anthraquinone pigment, a quinacridone pigment and a carbon black pigment are preferable.

Specific examples of organic pigments that may be used in the invention are described below.

Examples of organic pigments for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of organic pigments for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of organic pigments for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and aluminum phthalocyanine pigments crosslinked with siloxane such as those described in U.S. Pat. No. 4,311,775.

Examples of organic pigments for black include C.I. Pigment Black 1, C.I. Pigment Black 6 and C.I. Pigment Black 7.

Dispersant

The pigment is preferably dispersed in an aqueous solvent by a dispersant. The dispersant may be a polymer dispersant or a low-molecular-weight surfactant dispersant. The polymer dispersant may be either a water-soluble dispersant or a water-insoluble dispersant.

With the low-molecular-weight surfactant dispersant (also referred to as "low-molecular-weight dispersant" in the following) an organic pigment can be stably dispersed in an aqueous medium, while maintaining the viscosity of the ink at a low level. The low-molecular-weight dispersant referred herein has a molecular weight of 2,000 or less. The molecular weight of the low-molecular-weight dispersant is preferably from 100 to 2,000, and more preferably from 200 to 2,000.

The low-molecular-weight dispersant has a structure containing a hydrophilic group and a hydrophobic group. The number of the hydrophilic group and the number of the hydrophobic group in one molecule of the low-molecular-weight dispersant are each independently one or more, and the low-molecular-weight dispersant may have plural kinds of hydrophilic group and/or plural kinds of hydrophobic group. In embodiments, the low-molecular-weight dispersant may have a linking group which links the hydrophilic group and the hydrophobic group.

Examples of the hydrophilic group include an anionic group, a cationic group, a nonionic group, and a betaine group in which the above groups are combined.

The anionic group is not particularly limited so long as the group has a negative charge. The anionic group is preferably a phosphoric acid group, a phosphonic acid group, a phosphinic acid group, a sulfuric acid group, a sulfonic acid group, a sulfinic acid group or a carboxylic acid group, more preferably a phosphoric acid group or a carboxylic acid group, and still more preferably a carboxylic acid group.

The cationic group is not particularly limited so long as the group has a positive charge. The cationic group is preferably an organic cationic substituent, more preferably a cationic group containing a nitrogen or phosphorus atom, and still more preferably a cationic group containing a nitrogen atom. Among those, the cationic group is particularly preferably a pyridinium cation or an ammonium cation.

The nonionic group is not particularly limited so long as the group has no negative or positive charge. Examples of the nonionic group include polyalkylene oxide, polyglycerin and a sugar unit of a certain kind.

The hydrophilic group is preferably an anionic group from the viewpoint of dispersion stability and aggregation properties of a pigment.

When the low-molecular-weight dispersant has an anionic hydrophilic group, its pKa is preferably 3 or more in terms of promoting aggregation reaction upon contacting with an acidic reaction liquid. The pKa of the low-molecular-weight dispersant as used herein is a value experimentally obtained based on a titration curve that is obtained by titrating a 1 mmol/liter solution of the low-molecular-weight dispersant dissolved in a tetrahydrofuran/water solution (THF:water=3:2, V/V), with an acid or aqueous alkaline solution.

Theoretically, when the pKa of a low-molecular-weight dispersant is 3 or more, 50% or more of anionic groups are in a non-dissociation state when the ink composition is contacted with a reaction liquid having a pH of about 3.5 or less. Therefore, water solubility of the low-molecular-weight dispersant is remarkably decreased, and an aggregation reaction occurs, namely, aggregation reactivity is improved. From this viewpoint, the low-molecular-weight dispersant preferably has a carboxylic group as an anionic group.

The hydrophobic group may have, for example, any of a hydrocarbon structure, a fluorocarbon structure, or a silicone structure, and a hydrocarbon structure is particularly preferable. The hydrophobic group may have a straight-chain structure or a branched structure. The hydrophobic group may have a single-chain structure or a chain structure having two or more chains. When the hydrophobic group has a structure having two or more chains, the structure may have plural kinds of hydrophobic group.

The hydrophobic group is preferably a hydrocarbon group having 2 to 24 carbon atoms, more preferably a hydrocarbon group having 4 to 24 carbon atoms, and further preferably a hydrocarbon group having 6 to 20 carbon atoms.

When the polymer dispersant is a water-soluble dispersant, examples thereof include a hydrophilic polymer compound. Examples of natural hydrophilic polymer compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

Examples of hydrophilic polymer compounds obtained by chemically modifying natural raw materials include cellulose polymers such as methyl cellulose, ethyl cellulose, hydroxyethyl cellulose, hydroxypropyl cellulose and carboxymethyl cellulose, starch polymers such as sodium starch glycolate (sodium salt of starch glycolate), and sodium starch phosphate (sodium salt of starch phosphate[ester]), and algae polymers such as propylene glycol alginate.

Examples of synthetic hydrophilic polymer compounds include vinyl polymers such as polyvinyl alcohol, polyvinyl pyrrolidone and polyvinyl methyl ether; acrylic resins such as polyacrylamide, polyacrylic acid and alkali metal salts thereof, or water-soluble styrene acrylic resin; water-soluble styrene maleic acid resin; water-soluble vinylnaphthalene acrylic resin; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group.

Among those, a polymer compound containing a carboxyl group is preferable from the viewpoint of dispersion stability and aggregation properties of pigment. Polymer compounds containing a carboxyl group such as the following are particularly preferable: acrylic resins such as water-soluble styrene acrylic resins; water-soluble styrene maleic acid resins; water-soluble vinylnaphthalene acrylic resins; and water-soluble vinylnaphthalene maleic acid resins.

Examples of water-insoluble dispersants among the polymer dispersants include polymers each having both hydrophilic and hydrophobic moieties, such as styrene-(meth) acrylic acid copolymers, styrene-(meth)acrylic acid-(meth) acrylic ester copolymers, (meth)acrylic ester-(meth)acrylic acid copolymers, polyethylene glycol (meth)acrylate-(meth) acrylic acid copolymers, and styrene-maleic acid copolymers.

The weight average molecular weight of the polymer dispersant is preferably from 3,000 to 200,000, more preferably from 5,000 to 100,000, further preferably from 5,000 to 80,000, and yet further preferably from 10,000 to 60,000.

The ratio of an amount of the pigment to an amount of the dispersant (pigment:dispersant) in the ink composition in terms of mass is preferably in a range of from 1:0.06 to 1:3, more preferably in a range of from 1:0.125 to 1:2, and still more preferably in a range of from 1:0.125 to 1:1.5.

The ink composition may further contain a dye as long as the effects of the invention are not impaired.

In embodiments, the dye may be in a form of a water-insoluble colorant, in which a dye is retained on a water-insoluble carrier. The dye may be selected from known dyes without particular restrictions, and the dyes described in, for example, JP-A Nos. 2001-115066, 2001-335714, and 2002-249677 may be used suitably in the invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the invention.

The carrier retaining the dye (namely, a water-insoluble colorant) may be used in the form of an aqueous dispersion containing a dispersant. Examples of the dispersant are similar to those of the dispersant used for dispersing the pigment.

The ink composition preferably contains a pigment and a dispersant, more preferably contains an organic pigment and a polymer dispersant, and particularly preferably contains an organic pigment and a polymer dispersant containing carboxyl group, in consideration of the light-fastness, quality, and the like of the image. From the viewpoint of aggregation properties and fixability of an ink, the combination of the pigment and the dispersant is preferably a water-insoluble organic pigment covered with a polymer dispersant, more preferably a water-insoluble organic pigment covered with a carboxyl group-containing polymer dispersant, and further preferably a water-insoluble organic pigment covered with an acrylic polymer dispersant. Examples of the acrylic polymer include acrylic resins such as water-soluble styrene acrylic resins; water-soluble styrene maleic acid resins; water-soluble vinylnaphthalene acrylic resins; and water-soluble vinylnaphthalene maleic acid resins.

From the viewpoint of aggregation properties, it is preferable that the acid value of the polymer dispersant is larger than the acid value of polymer particles (preferably self-dispersing polymer particles) which are explained below.

The average particle diameter of the pigment is preferably from 10 nm to 200 nm, more preferably from 10 nm to 150 nm, and still more preferably from 10 nm to 100 nm. When the average particle diameter is 200 nm or less, color reproducibility of the ink set may be excellent, and droplet jetting properties of the ink composition may be excellent when subjected to an inkjet method. When the average particle diameter is 10 nm or more, light-fastness of images formed from the ink set may be excellent. The particle size distribution of the pigment is not particularly limited, and may be a broad particle size distribution or a monodispersed particle size distribution. In embodiments, a mixture of two or more pigments, each of which having a monodispersed particle size distribution, may be used.

The volume average particle diameter and particle size distribution of the polymer particles are values which can be obtained by measuring particle diameters by a dynamic light scattering method, using a NANOTRAC particle size distribution measuring instrument UPA-EX150 (trade name, manufactured by NIKKISO Co., Ltd.).

From the viewpoint of image density, the content of pigment in the ink composition is preferably from 1% by mass to 25% by mass, more preferably from 2% by mass to 20% by mass, still more preferably from 5% by mass to 20% by mass, and particularly preferably from 5% by mass to 15% by mass, with respect to the total amount of the ink composition.

The pigment may be used singly or in combination of two or more thereof.

Polymer Particles

The ink composition employed in the invention may contain at least one kind of polymer particles. The inclusion of the polymer particles may effectively improve rubbing resistance of images formed from the ink set, and may lead viscosity increasing and solidifying of the ink composition with ease so that the cleaning effect of a maintenance liquid may be enhanced.

A resin used for the polymer particles may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers and mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these monomers, an acrylic monomer having a carboxyl group is preferable. Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are particularly preferable.

In preferable embodiments, the polymer particles employed in the invention can be self-dispersible polymer particles, and in more preferable embodiments, the polymer particles employed in the invention can be self-dispersible polymer particles having a carboxyl group, from the viewpoint of jetting stability and stability of ink composition as liquid (particularly dispersion stability) with containing the pigment. The "self-dispersible polymer particles" refer to particles of a water-insoluble polymer that can be in a dispersion state in an aqueous medium in the absence of another surfactant by a functional group (particularly an acidic group or a salt thereof) contained in the polymer and that does not contain a free emulsifier.

The "dispersion state" can be either an emulsion state, in which the water-insoluble polymer is dispersed as a liquid in an aqueous medium, or a suspension state, in which the water-insoluble polymer is dispersed as a solid in an aqueous medium.

From the viewpoint of the aggregation rate and the fixing property when the water-insoluble polymer is employed to form the ink composition, the water-insoluble polymer used in the invention is preferably one that can be in the suspension state.

The self-dispersible polymer particles employed in the invention can be visually observed as being in the dispersion state at 25° C. for at least one week, even when the dispersion thereof is prepared by mixing and stirring, by using a stirrer having a stirring blade with number of rotations of 200 rpm for 30 minutes at 25° C., a mixture of a solution containing 30 g of the water-insoluble polymer dissolved in 70 g of organic solvent such as methyl ethyl ketone, a neutralizer which can neutralize all salt-forming groups of the water-insoluble polymer, and 200 g of water, and then removing the organic solvent from the mixture solution, although the neutralizer is either sodium hydroxide when the salt-forming group is anionic or is acetic acid when a salt-forming group is cationic.

The "water-insoluble polymer" refers to a polymer whose dissolved amount to 100 g of water at 25° C. is 10 g or lower when the polymer is dried at 105° C. for 2 hours and then dissolved in the water. The dissolved amount is preferably 5 g or lower, and more preferably 1 g or lower. The "dissolved amount" is an amount of (a part of) the water-insoluble polymer dissolved in a solvent (water) when the water-insoluble polymer is completely neutralized with sodium hydroxide or acetic acid, wherein the selection from the sodium hydroxide and the acetic acid accords to the type of the salt-forming group of the water-insoluble polymer.

The aqueous medium contains water and may further contain a hydrophilic organic solvent as required. In preferable embodiments, the aqueous medium contains water and a hydrophilic organic solvent, an amount of the hydrophilic organic solvent being in a range of from 0.2% by mass or lower with respect to water, and in more preferable embodiments, the aqueous medium is substantially water.

There is no limitation on the main chain skeleton of the water-insoluble polymer. Examples include vinyl polymer and a condensed polymer (e.g., an epoxy resin, polyester, polyurethane, polyamide, cellulose, polyether, polyurea, polyimide, and polycarbonate). Among the above, vinyl polymer is particularly preferable.

Preferable examples of vinyl polymer and a monomer which configures vinyl polymer include substances disclosed in JP-A Nos. 2001-181549 and 2002-88294. Moreover, a vinyl monomer in which a dissociative group has been introduced into a terminal of a polymer by radical polymerization of a vinyl polymer using a chain transfer agent or a polymerization initiator having a dissociative group (or a substituent that can be induced to be a dissociative group) or an iniferter or by ion polymerization using a compound having a dissociative group (or a substituent that can be induced to be a dissociative group) in either an initiator or a stopper also can be used.

Preferable examples of a condensed polymer and a monomer which configures the condensed polymer include substances described in JP-A No. 2001-247787.

In preferable embodiments, the self-dispersible polymer particles employed in the invention contains a water-insoluble polymer containing a hydrophilic structural unit and a structural unit derived from an aromatic group-containing monomer from the viewpoint of improving self-dispersibility and removability (washability) of the ink composition that can have low removability.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The "structural unit (of a polymer) derived from a (specific) monomer" herein means a unit that has a structure which can be typically incorporated into the polymer by employing the (specific) monomer as that to be polymerized for forming the polymer.

The hydrophilic group is preferably a dissociative group, and more preferably an anionic dissociative group, from the viewpoint of promoting the self-dispersibility and improving stability of the emulsion state or dispersion state of the self-dispersible polymer particles. Examples of the dissociative group include a carboxyl group, a phosphonic acid group, and a sulfonic acid group. Among the above, the carboxyl group is preferable from the viewpoint of fixing property when the ink composition is formed therewith.

The hydrophilic group-containing monomer is preferably a dissociative group-containing monomer from the viewpoint of self-dispersibility and aggregation properties, and specifically, the hydrophilic group-containing monomer is preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoint of dispersion stability and jetting stability, the unsaturated carboxylic acid monomer is preferable, and acrylic acid and methacrylic acid are more preferable.

In preferable embodiments, the self-dispersible polymer particles employed in the invention contain a polymer having a carboxyl group from the viewpoint of improving self-dispersibility and an aggregation rate when the ink composition contacts an acidic reaction liquid to enhance aggregation reaction to form images. In more preferable embodiments, the self-dispersible polymer particles employed in the invention contain a polymer having a carboxyl group and an acid value (mgKOH/g) of 25 to 100. In further preferable embodiments, the acid value is from 25 to 80, and in particularly preferable embodiments, the acid value is from 30 to 65, from the viewpoint of improving self-dispersibility and the aggregation rate when the ink composition contacts an acidic reaction liquid.

There is no limitation on the aromatic group-containing monomer insofar as it is a compound containing an aromatic group and a polymerizable group. The aromatic group may be a group having an aromatic hydrocarbon or a group having an aromatic heterocyclic ring. In embodiments, the aromatic group is preferably an aromatic group having an aromatic hydrocarbon from the viewpoint of particle shape stability in an aqueous medium.

The polymerizable group may be a condensation polymerizable group or an addition polymerizable group. In embodiments, from the viewpoint of particle shape stability of the self-dispersible polymer particles in the aqueous medium, the polymerizable group preferably an addition polymerizable group, and more preferably a group containing an ethylenically unsaturated bond.

The aromatic group-containing monomer employed in the invention is preferably a monomer having an ethylenically unsaturated bond and an aromatic group having an aromatic hydrocarbon. The aromatic group-containing monomers may be used singly or in combination of two or more.

Examples of the aromatic group-containing monomer include phenoxyethyl(meth)acrylate, benzyl(meth)acrylate, phenyl(meth)acrylate, and a styrene monomer. Examples which are preferable from the viewpoint of well-balancing hydrophilicity and hydrophobicity of the polymer chain of the self-dispersible polymer particles and ink fixing property include an aromatic group-containing (meth)acrylate monomer. Specifically, phenoxyethyl(meth)acrylate, benzyl(meth)acrylate, and phenyl(meth)acrylate are more preferable, and phenoxyethyl(meth)acrylate and benzyl(meth)acrylate are further preferable.

The "(meth)acrylate" refers to acrylate or methacrylate.

In preferable embodiments, the self-dispersible polymer particles employed in the invention contains a structural unit derived from the aromatic group-containing (meth)acrylate monomer, the content of which being from 10% by mass to 95% by mass with respect to the total amount of the water-insoluble polymer which forms the self-dispersible polymer particles. When the content of the aromatic group-containing (meth)acrylate monomer is from 10% by mass to 95% by mass, self-emulsifying property or stability of the dispersion state improves to thereby suppress an increase in ink viscosity.

In embodiments, the content of the aromatic group-containing (meth)acrylate monomer is more preferably from 15% by mass to 90% by mass, more preferably from 15% by mass to 80% by mass, and particularly preferably from 25% by mass to 70% by mass, from the viewpoint of improvement in self-emulsifying property or stability of the dispersion state, stabilization of the particle shape in an aqueous medium due to hydrophobic interaction of aromatic rings, and reduction in the amount of water-soluble components via appropriate hydrophobilyzation of particles.

The self-dispersible polymer particles employed in the invention can be formed by using, for example, a structural unit derived from the aromatic group-containing monomer and a structural unit derived from the dissociative group-containing monomer. The self-dispersible polymer particles may further contain other structural units.

While there is no limitation on a monomer which forms the other structural unit insofar as it can be copolymerized with the aromatic group-containing monomer and the dissociative group-containing monomer, from the viewpoint of flexibility of the main chain skeleton of the water-insoluble polymer or ease of regulation of glass transition temperature (Tg), an alkyl group-containing monomer is preferable.

Examples of the alkyl group-containing monomer include alkyl(meth)acrylates, such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, or ethylhexyl (meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylamino alkyl (meth)acrylates, such as dimethylaminoethyl(meth)acrylate; N-hydroxyalkyl(meth)acrylamides, such as N-hydroxymethyl(meth)acrylamide, N-hydroxyethyl(meth)acrylamide, or N-hydroxybutyl(meth)acrylamide; and (meth)acrylamides, such as N-alkoxyalkyl(meth)acrylamides, such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide, or N-(n-, iso)butoxyethyl(meth) acrylamide.

The molecular weight range of the water-insoluble polymer which configures the self-dispersible polymer particles employed in the invention is, in terms of weight average molecular weight, preferably from 3,000 to 200,000, more preferably from 5,000 to 150,000, and still more preferably from 10,000 to 100,000. By adjusting the weight average molecular weight to 3,000 or more, the content of water-soluble components can be effectively reduced. By adjusting the weight average molecular weight to 200,000 or lower, stability of self-dispersibility can be increased.

The weight average molecular weight can be measured by gel permeation chromatography (GPC). HLC-8220GPC (trade name, manufactured by Tosoh Corporation) is used as GPC apparatus, three columns of TSKGEL SUPER MULTI-PORE HZ-H (trade name, manufactured by Tosoh Corporation, 4.6 mmID×15 cm) are connected in series are used as chromatography columns, and THF (tetrahydrofuran) is used as an eluate. The measurement is performed using a refractive index detector under the conditions of a sample concentration of 0.35% by mass, a flow rate of 0.35 ml/min., an injection amount of a sample of 10 μl, and a measurement temperature of 40° C. Calibration curves are prepared by eight samples of REFERENCE SAMPLE TSK STANDARD, POLYSTYRENE (trade name, manufactured by Tosoh Corporation): "F-40", "F-20", "F-4", "F-1", "A-5000", "A-2500", "A-1000" and "n-propylbenzene".

From the viewpoint of regulation of hydrophilicity and hydrophobicity of a polymer, in preferable embodiments, the water-insoluble polymer which configures the self-dispersible polymer particles employed in the invention contains a structural unit derived from the aromatic group-containing (meth)acrylate monomer (preferably a structural unit derived from phenoxyethyl(meth)acrylate and/or a structural unit derived from benzyl(meth)acrylate), wherein the content (copolymerization ratio) of the aromatic group-containing (meth)acrylate monomer is from 15% by mass to 80% by mass with respect to the total amount of self-dispersible polymer particles.

From the viewpoint of regulation of hydrophilicity and hydrophobicity of a polymer, in preferable embodiments, the water-insoluble polymer preferably contains a structural unit derived from the aromatic group-containing (meth)acrylate monomer, a structural unit derived from a carboxyl group-containing monomer, and a structural unit derived from an alkyl group-containing monomer (preferably a structural unit derived from alkyl ester of (meth)acrylic acid wherein the content (copolymerization ratio) of the aromatic group-containing (meth)acrylate monomer is from 15% by mass to 80% by mass with respect to the total amount of self-dispersible polymer particles. In more preferable embodiments, the water-insoluble polymer contains a structural unit derived from phenoxyethyl(meth)acrylate and/or a structural unit derived from benzyl(meth)acrylate, a structural unit derived from a carboxyl group-containing monomer, and a structural unit derived from an alkyl group-containing monomer (preferably a structural unit derived from alkyl ester having (meth) acrylic acid having 1 to 4 carbon atoms), wherein the content (copolymerization ratio) of the phenoxyethyl(meth)acrylate and/or a structural unit derived from benzyl(meth)acrylate is from 15% by mass to 80% by mass with respect to the total amount of self-dispersible polymer particles. In addition, the water-insoluble polymer preferably has the acid value of from 25 mgKOH/g to 100 mgKOH/g, and the weight average molecular weight of 3,000 to 200,000, and more preferably has the acid value of from 25 to 95 and the weight average molecular weight of 5,000 to 150,000.

Hereinafter, exemplary compounds B-01 to B-20 are shown as specific examples of the water-insoluble polymer which configures the self-dispersible polymer particles, although the invention is not limited thereto. The ratio in the brackets represents the weight ratio of copolymerization components.

B-01: Phenoxyethyl acrylate/Methyl methacrylate/Benzyl methacrylate/Acrylate copolymer (30/50/15/5)
B-02: Phenoxyethyl acrylate/Methyl methacrylate/Acrylate copolymer (50/45/5)
B-03: Phenoxyethyl acrylate/Benzyl methacrylate/Isobutyl methacrylate/Methacrylate copolymer (30/35/29/6)
B-04: Phenoxyethyl methacrylate/Isobutyl methacrylate/Methacrylate copolymer (50/44/6)
B-05: Phenoxyethyl acrylate/Methyl methacrylate/Ethylacrylate/Acrylate Copolymer (30/55/10/5)
B-06: Benzyl methacrylate/Isobutyl methacrylate/Methacrylate copolymer (35/59/6)
B-07: Styrene/Phenoxyethyl acrylate/Methyl methacrylate/Acrylate copolymer (10/50/35/5)
B-08: Benzyl acrylate/Methyl methacrylate/Acrylate copolymer (55/40/5)
B-09: Phenoxyethyl methacrylate/Benzyl acrylate/Methacrylate copolymer (45/47/8)
B-10: Styrene/Phenoxyethyl acrylate/Butyl methacrylate/Acrylate copolymer (5/48/40/7)
B-11: Benzyl methacrylate/Isobutyl methacrylate/Cyclohexyl methacrylate/Methacrylate copolymer (35/30/30/5)
B-12: Phenoxyethyl acrylate/Methyl methacrylate/Butyl acrylate/Methacrylate copolymer (12/50/30/8)
B-13: Benzyl acrylate/Isobutyl methacrylate/Acrylate copolymer (93/2/5)
B-14: Styrene/Phenoxyethyl methacrylate/Butyl acrylate/Acrylate copolymer (50/5/20/25)
B-15: Styrene/Butyl acrylate/Acrylate copolymer (62/35/3)
B-16: Methyl methacrylate/Phenoxyethyl acrylate/Acrylate copolymer (45/51/4)
B-17: Methyl methacrylate/Phenoxyethyl acrylate/Acrylate copolymer (45/49/6)
B-18: Methylmethacrylate/Phenoxyethyl acrylate/Acrylate copolymer (45/48/7)
B-19: Methyl methacrylate/Phenoxyethyl acrylate/Acrylate copolymer (45/47/8)
B-20: Methylmethacrylate/Phenoxyethyl acrylate/Acrylate Copolymer (45/45/10)

There is no limitation on a method of producing the water-insoluble polymer which configures the self-dispersible polymer particles employed in the invention. Examples include: a method including performing emulsion polymerization in the presence of a polymerizable surfactant to covalently bind a surfactant and a water-insoluble polymer; and a method including copolymerizing a monomer mixture containing the hydrophilic group-containing monomer and the aromatic group-containing monomer by known polymerization methods such as a solution-polymerization method or a bulk-polymerization method. Among the polymerization methods, the solution-polymerization method is preferable, and the solution-polymerization method using an organic solvent is more preferable, from the viewpoint of an aggregation rate and droplet jetting stability when the self-dispersible polymer particles are employed in the ink composition.

From the viewpoint of an aggregation rate, it is preferable that the self-dispersible polymer particles employed in the invention contain a polymer, the polymer being synthesized in an organic solvent and having a carboxyl group (preferably the acid value thereof being 20 to 100), and the self-dispersible polymer particles being prepared as a polymer dispersion in which the carboxyl group of the polymer is partially or thoroughly neutralized and water serves as a continuous phase. More specifically, the production of the self-dispersible polymer particles employed in the invention preferably has synthesizing a polymer in an organic solvent and dispersing the polymer to form an aqueous dispersion in which at least a part of the carboxyl group of the polymer is neutralized.

The dispersing preferably includes the following processes (1) and (2).

Process (1): Stirring a mixture containing a polymer (water-insoluble polymer), an organic solvent, a neutralizer, and an aqueous medium; and Process (2): Removing the organic solvent from the mixture.

The process (1) preferably includes obtaining a dispersion by dissolving the polymer (water-insoluble polymer) in an organic solvent first, gradually adding a neutralizer and an aqueous medium, and mixing and stirring the mixture. The addition of the neutralizer and the aqueous medium in a solution of the water-insoluble polymer in which the polymer has been dissolved into an organic solvent may enable to provide self-dispersible polymer particles having particle diameters which may enable to achieve higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the solvents, the ketone solvent such as methyl ethyl ketone, and the alcohol solvent such as isopropyl alcohol are preferable. It is also preferable to use isopropyl alcohol and methyl ethyl ketone in combination in view of making the change in polarity at the time of phase inversion from an oil phase to a water phase being moderate. By using the solvents in combination, self-dispersible polymer particles that can be free from coagulation-precipitation or fusion of particles and can have high dispersion stability and fine particle diameters can be obtained.

The neutralizer is used for forming an emulsion state or a dispersion state in which the dissociative group is partially or thoroughly neutralized and the self-dispersible polymer is stabilized in water. Examples of the neutralizer which can be used when the self-dispersible polymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the self-dispersible polymer particles employed in the invention in water, sodium hydroxide, potassium hydroxide, triethylamine, and triethanolamine are preferable.

The content of the basic compound is preferably from 5 mol % to 120 mol %, more preferably from 10 mol % to 110 mol %, and still more preferably from 15 mol % to 100 mol %, with respect to 100 mol % of the dissociative groups. Stabilization of the dispersion of the particles in water can be demonstrated when the content of the basic compound is adjusted to 5 mol % or more, can be more demonstrated when the content of the basic compound is adjusted to 10 mol % or more, and can be further demonstrated when the content of the basic compound is adjusted to 15 mol % or more. Reduction in a content of the water-soluble components can be achieved when the content of the basic compound is adjusted to 120 mol % or lower, can be more achieved when the content of the basic compound is adjusted to 110 mol % or lower, and can be further achieved when the content of the basic compound is adjusted to 100 mol % or lower.

In the process (2), an aqueous dispersion of the self-dispersible polymer particles can be obtained by inverting a phase of the dispersion, which has been obtained in the process (1), to a water phase by common procedures such as vacuum distillation distilling off the organic solvent from. The thus-obtained aqueous dispersion is substantially free of the organic solvent. The amount of the organic solvent contained in the aqueous dispersion is preferably 0.2% by mass or lower, and more preferably 0.1% by mass or lower.

The average particle diameter of the polymer particles (particularly the self-dispersible polymer particles) is, in terms of a volume average particle diameter, preferably in the range of from 10 nm to 400 nm, more preferably in the range of from 10 nm to 200 nm, still more preferably in the range of from 10 nm to 100 nm, and particularly preferably in the range of from 10 nm to 50 nm. When the average particle diameter is 10 nm or more, production suitability of the polymer particles may be increased. When the average particle diameter is 400 nm or lower, the storage stability may be increased. The particle size distribution of the polymer particles is not particularly limited. The polymer particles may have either a broad particle size distribution or a monodisperse particle size distribution. Two or more water-insoluble particles may be used in combination as a mixture.

The average particle diameter and particle size distribution of the polymer particles can be determined by measuring the volume average particle diameter by dynamic light scattering using a nanotruck particle size distribution meter UPA-EX150 (trade name, manufactured by Nikkiso Co., Ltd.).

From the viewpoint of rubbing resistance and glossiness of an image formed from the ink composition and the like, the content of the polymer particles (particularly the self-dispersible polymer particles) in the ink composition is preferably from 1% by mass to 30% by mass, and more preferably 2% by mass to 15% by mass, with respect to the total amount of the ink composition.

The polymer particles (particularly the self-dispersible polymer particles) can be used singly or in a form of a mixture of two or more thereof.

Hydrophilic Organic Solvent

The ink composition employed in the invention preferably contains water as a solvent. Preferably, the ink composition further contains at least one hydrophilic organic solvent. When the ink composition contains a hydrophilic organic solvent, drying may be suppressed and penetration may be enhanced. Use of a hydrophilic organic solvent as an anti-drying agent can effectively suppress clogging of a nozzle which may otherwise occur due to drying of the ink composition at an ink jetting port when the ink composition is jetted by an inkjet method to record an image.

A hydrophilic organic solvent having vapor pressure lower than that of water may be preferable for suppressing drying. Specific examples of the hydrophilic organic solvent for suppressing drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of a polyhydric alcohol, such as ethylene glycol monomethyl (or ethyl)ether, diethylene glycol monomethyl (or ethyl)ether and triethylene glycol monoethyl (or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulfolene; polyfunctional compounds such as diacetone alcohol and diethanolamine; and urea derivatives.

Herein, a "derivative" of a specific compound means a compound obtained by substituting, for an atom or an atomic group which is a partial structure of the specific compound, another atom or another atomic group.

Among them, polyhydric alcohols such as glycerin and diethylene glycol are preferable. The hydrophilic organic solvent may be used alone or in combination of two or more thereof. Those hydrophilic organic solvent is preferably contained in an amount of from 10% by mass to 50% by mass with respect to the total amount of the ink composition.

A hydrophilic organic solvent may be also suitably used from the viewpoint of improving penetration of an ink composition into a recording medium. Specific examples of a suitable hydrophilic organic solvent for enhancing penetration include alcohols, such as ethanol, isopropanol, butanol, di(or tri)ethylene glycol monobutyl ether, and 1,2-hexanediol; sodium lauryl sulfate; sodium oleate; and nonionic surfactants. Favorable effect may be obtained when the ink composition contains such a hydrophilic organic solvent at a content of from 5% by mass to 30% by mass with respect to the total amount of the ink composition. The hydrophilic organic solvent is preferably used in an amount at which bleeding of printed characters and images and/or print through do not occur.

The hydrophilic organic solvent may be used to adjust viscosity. Specific examples of the hydrophilic organic solvent that may be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formaldehyde, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The hydrophilic organic solvent may be used alone or in combination of two or more thereof.

Surfactant

The ink composition employed in the invention preferably contains at least one surfactant. The surfactant may be used as a surface-tension controller. Examples of the surface-tension controller include nonionic surfactants, cationic surfactants, anionic surfactants, and betaine surfactants.

The ink composition preferably contains a surfactant in such an amount that the surface tension of the ink composition is adjusted to be from 20 mN/m to 60 mN/m, so as to allow droplets of the ink composition to be favorably jetted by an inkjet method. In particular, the content of the surfactant is preferably such an amount that the surface tension is adjusted to be from 20 mN/m to 45 mN/m, more preferably such an amount that the surface tension is adjusted to be from 25 mN/m to 40 mN/m.

The surface tension of the ink composition is measured by a plate method under the condition of 25° C. using an automatic surface tensiometer CBVP-Z (trade name, manufactured by Kyowa Interface Science Co. Ltd.).

Examples of the surfactant includes hydrocarbon surfactant. Specific examples of the hydrocarbon surfactant include anionic surfactants such as fatty acid salts, alkyl sulfates, alkyl benzene sulfonates, alkyl naphthalene sulfonates, dialkyl sulfosuccinates, alkyl phosphates, formalin condensates of naphthalene sulfonates and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Specific examples thereof further include acetylene-type polyoxyethyleneoxide surfactants, such as SURFYNOL series (trade name, manufactured by Air Products & Chemicals, Inc.), and amine oxide amphoteric surfactants such as N,N-dimethyl-N-alkylamine oxide.

Compounds described as surfactants in JP-A No. 59-157636, pp. 37 to 38 and Research Disclosure No. 308119 (1989) are also applicable.

Rubbing resistance of images formed from the ink set of the invention may be improved by using fluorine (fluoroalkyl) surfactants, silicone surfactants or the like, and examples thereof include those described in JP-A Nos. 2003-322926, 2004-325707 and 2004-309806.

The surface-tension controller may also be used as an anti-foam agent, and fluorine compounds, silicone compounds, chelate compounds such as EDTA are applicable.

Water

The ink composition employed in the invention preferably contains water. The content of water in the ink composition is not particularly limited. The content of water in the ink composition employed in the invention is preferably from 10% by mass to 99% by mass, more preferably from 30% by mass to 80% by mass, still more preferably from 50% by mass to 70% by mass, with respect to the total amount of the ink composition.

Other Additives

The ink composition used in the invention may further include other additives than the aforementioned components. Examples thereof include known additives including an antifading agent, an emulsion stabilizer, a penetration enhancing agent, a UV absorber, an antiseptic agent, an antimildew agent, a pH adjuster, an anti-foam agent, a viscosity adjuster, a dispersant, a dispersion stabilizer, an antirust agent and a chelating agent. These additives may be added to the ink composition either after the preparation of the ink composition or during the preparation of the ink composition.

Examples of the pH adjuster include a neutralizer such as an organic base or an inorganic alkali. The pH adjuster is preferably added such that the pH of the ink composition becomes a value of from 6 to 10, more preferably from 7 to 10, with a view to improving the storability of the ink composition.

The viscosity of the ink composition employed in the invention is preferably in the range of from 1 mPa·s to 30 mPa·s, more preferably from 1 mPa·s to 20 mPa·s, still more preferably from 2 mPa·s to 15 mPa·s, especially preferably from 2 mPa·s to 10 mPa·s, from the viewpoint of improving the jetting stability when the ink composition is jetted by an inkjet method and the coagulation rate when the ink composition contacts the reaction liquid employed in the invention.

The viscosity of the ink composition is measured using a VISCOMETER TV-22 (trade name, manufactured by TOKI SANGYO CO. LTD) at 20° C.

Reaction Liquid

The ink set for inkjet recording of the invention includes a reaction liquid that includes a reactant that produces an aggregate when contacted with an aqueous ink composition. The static surface tension of the reaction liquid is 40 mN/m or higher. When the dynamic surface tension of the reaction liquid at a surface lifetime of 100 ms and 10000 ms is $\gamma 0.1$ and $\gamma 10$, respectively, according to the maximum bubble pressure technique, the dynamic surface tension $\gamma 0.1$ is from 40 mN/m to 50 mN/m and the ratio $\gamma$ ($\gamma 0.1/\gamma 10$) of the dynamic surface tension is from 1.01 to 1.10.

When $\gamma 0.1$ is less than 40 mN/m, the reaction liquid may permeate deeply in to the recording medium, resulting in insufficient coagulation of the ink when rendering an image with the ink. Further, when $\gamma 0.1$ exceeds 50 mN/m, the reaction liquid may tend to spread over the recording medium less easily and it may be difficult to coat the reaction liquid evenly. Further, the ratio $\gamma$ cannot practically be lowered below 1.01. In addition, when the ratio $\gamma$ exceeds 1.10, the surface action of the reaction liquid at the time of coating may change due to the fluid state thereof and the coating becomes unstable, as a result of which it may become difficult to coat the reaction liquid evenly.

The reaction liquid employed in the invention includes at least one kind of reactant (also referred to as a coagulant in the following) that is able to form an aggregate by aggregating dispersed particles in an aqueous ink composition such as pigment particles when mixed with the aqueous ink composition and, further, may include other components as necessary. Use of a reaction liquid together with an aqueous ink composition enables higher-speed inkjet recording and formation of images having high density and resolution even when recording is performed at high speed.

Reaction Liquid Properties

The static surface tension of the reaction liquid employed in the invention is required to be 40 mN/m or higher in view of evenness of the recorded image, and is preferably from 40 mN/m to 50 mN/m. The static surface tension is measured at 25° C. using the AUTOMATIC SURFACE TENSIOMETER CBVP-Z (trade name, manufactured by Kyowa Interface Science Co., Ltd.) according to the Wilhelmy Method using a platinum plate.

The dynamic surface tension of the reaction liquid employed in the invention is measured at 25° C. using the BUBBLE PRESSURE DYNAMIC SURFACE TENSIOMETER BP-2 (trade name, manufactured by Krüss GmbH).

When the value of the dynamic surface tension at a surface lifetime of 100 ms and 10000 ms is $\gamma 0.1$ and $\gamma 10$, respectively, the dynamic surface tension $\gamma 0.1$ is required to be from 40 mN/m to 50 mN/m and the ratio $\gamma$ ($\gamma 0.1/\gamma 10$) of the dynamic surface tension from 1.01 to 1.10 and, preferably, the dynamic surface tension $\gamma 0.1$ is from 40 mN/m to 50 mN/m and the ratio $\gamma$ ($\gamma 0.1/\gamma 10$) of the dynamic surface tension from 1.01 to 1.08.

By ensuring that the static surface tension and the dynamic surface tension of the reaction liquid employed in the invention have the foregoing specific properties a recorded image formed by contact with the aqueous ink composition in the invention may have uniform dot size and shape.

In the reaction liquid employed in the invention, a combination of a static surface tension of from 40 mN/m to 50 mN/m, a dynamic surface tension $\gamma 0.1$ of from 40 mN/m to 50 mN/m and a ratio $\gamma$ ($\gamma 0.1/\gamma 10$) of the dynamic surface tension of from 1.01 to 1.10 is preferable, and a combination of a static surface tension of from 40 mN/m to 50 mN/m, a dynamic surface tension $\gamma 0.1$ of from 40 mN/m to 50 mN/m and a ratio $\gamma$ ($\gamma 0.1/\gamma 10$) of the dynamic surface tension of from 1.01 to 1.08 is more preferable.

The foregoing static surface tension and dynamic surface tension may be regulated by selecting one aqueous organic solvent or a combination of plural aqueous organic solvents with which the above properties can be obtained.

From the viewpoint of the coagulation speed of the ink composition, the viscosity of the reaction liquid is preferably in a range of from 1 mPa·s to 30 mPa·s, more preferably from 1 mPa·s to 20 mPa·s, especially preferably from 2 mPa·s to 15 mPa·s and particularly preferably from 2 mPa·s to 10 mPa·s. This value of the viscosity is that measured using a VISCOMETER TV-22 (manufactured by TOKI SANGYO CO. LTD) under the condition of 20° C.

Reactant

The reaction liquid includes at least one kind of reactant that is able to form an aggregate by contacting with an aqueous ink composition. Mixing the reaction liquid with an aqueous ink composition that has been ejected by an inkjet method results in the facilitation of aggregation of a pigment or the like that is stably dispersed in the aqueous ink composition.

Examples of the reaction liquid include liquids that can produce an aggregate by changing the pH of an aqueous ink composition. Here, the pH (at 25° C.±1° C.) of the reaction liquid is preferably no more than 3.5, more preferably from 0.5 to 2.5, still more preferably from 0.7 to 2.3 and particularly preferably from 0.8 to 2.0, in view of the speed of coagulation of the aqueous ink composition. In this case, the pH (at 25° C.±1° C.) of the aqueous ink composition used in the ejection process is, as is similar to that for the aqueous ink composition, preferably 7.0 or higher and more preferably from 7 to 10.

In embodiments, in view of image density, resolution and increasing the speed of inkjet recording, the pH (at 25° C.±1° C.) of the aqueous ink composition is preferably 7.0 or higher and the pH (at 25° C.±1° C.) of the reaction liquid is 3.5 or below.

One kind of coagulant may be used singly or a mixture of two or more kinds thereof may be used.

The reaction liquid may contain an acidic compound as a coagulator. Examples of the acidic compound include a compound having a phosphoric acid group, a compound having a phosphonic acid group, a compound having a phosphine acid group, a compound having a sulphonyl acid group, a compound having a sulfonic acid group, a compound having a sulfinic acid group, a compound having a carboxyl group, and a salt (such as a polyvalent metal salt) of any of these compounds. The acidic compound may be preferably a compound having a phosphonic acid group and a compound having a carboxyl group, and more preferably a compound having a carboxyl group, in view of coagulation rate of the aqueous ink composition.

Specific examples of the acidic compound include polyacrylic acid, acetic acid glycollic acid, malonic acid, malic acid, maleic acid, ascorbic acid, succinic acid, glutaric acid, fumaric acid, citric acid, tartaric acid, lactic acid, sulfonic acid, phosphoric acid, metaphosphoric acid, orthophosphoric acid, pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, a derivative (such as an optical isomer) of any of these compounds, and a salt (such as a polyvalent metal salt) of any of these compounds. One kind of the acidic compound may be used singly or a mixture of two or more kinds thereof may be used.

Examples of the reaction liquid further include those containing, as a reactant which improves rapid coagulation property of the ink composition, a polyvalent metal salt or polyallylamine. Examples of the polyvalent metal salt include a metal salt of any of the following: a salt of an alkaline earth metal belonging to Group 2 of the Periodic Table (for example, magnesium or calcium), a salt of a transition metal belonging to Group 3 of the Periodic Table (for example, lanthanum), a salt of a cation derived from an element belonging to Group 13 of the Periodic Table (for example aluminum), or a salt a lanthanide (for example neodymium). Preferable examples of the metal salt include a carboxylate (such as a formate, an acetate, or a benzoate), a nitrate, a chloride, or a thiocyanate. Among them, more preferable examples include a calcium or magnesium salt of a carboxylic acid (such as formic acid, acetic acid, or benzoic acid), a calcium or magnesium salt of nitric acid, calcium chloride, magnesium chloride, and a calcium or magnesium salt of thiocyanic acid.

A content of the reactant in the reaction liquid is preferably in a range of from 15% by mass to 30% by mass, and more preferably in a range of from 17% by mass to 28% by mass, with respect to the total amount of the reaction liquid in view of the coagulating effect.

The reaction liquid contains at least the reactant, and may further contain an organic solvent, and may further contain an aqueous solvent such as water.

The organic solvent and other additives which can be contained in the reaction liquid are similar to those which can be contained in the aqueous ink composition.

Organic Solvent

The reaction liquid employed in the invention preferably contains an organic solvent. The organic solvent is preferably a hydrophilic organic solvent. When the reaction liquid contains an organic solvent (particularly, a hydrophilic organic solvent), the static surface tension and the dynamic surface tension of the reaction liquid can be regulated, drying of the reaction liquid may be suppressed, and penetration of the reaction liquid may be enhanced.

Specific examples of the hydrophilic organic solvent include those which can be contained in the aqueous ink composition.

One kind of the organic solvent may be used singly or a mixture of two or more kinds thereof may be used.

A content of the organic solvent in the reaction liquid is not particularly limited. In embodiments, it is preferably in a range of from 1% by mass to 30% by mass, and more preferably in a range of from 5% by mass to 15% by mass, with respect to the total amount of the reaction liquid. When the content of the organic solvent in this range of from 1% by mass to 30% by mass, the static surface tension and the dynamic surface tension of the reaction liquid can be regulated, drying of the reaction liquid may be suppressed, penetration of the reaction liquid may be enhanced, and reactions of acid and components in a recording medium may be suppressed.

The reaction liquid employed in the invention may further contain a surfactant, water, and other additives. The organic surfactant, water, and other additives which can be contained in the reaction liquid are similar to those which can be contained in the aqueous ink composition.

EXAMPLES

In the following, exemplary embodiments of the invention will be described in further details with reference to examples. However, the invention is not limited to these examples. The term "part" and "%" are based on mass, and "degree of polymerization" refers to an "average degree of polymerization" unless otherwise noted.

Measurement of the weight average molecular weight was performed by gel permeation chromatography (GPC). HLC-8220GPC (trade name, manufactured by Tosoh Corporation) is used as GPC apparatus, three columns of TSKGEL SUPER MULTIPORE HZ-H (trade name, manufactured by Tosoh Corporation, 4.6 mmID×15 cm) are used as chromatography columns, and THF (tetrahydrofuran) is used as an eluate. The measurement is performed using a refractive index detector under the conditions of a sample concentration of 0.35% by mass, a flow rate of 0.35 ml/min., an injection amount of a sample of 10 μl, and a measurement temperature of 40° C. Calibration curves are prepared by eight samples of REFERENCE SAMPLE TSK STANDARD, POLYSTYRENE (trade name, manufactured by Tosoh Corporation): "F-40", "F-20", "F-4", "F-1", "A-5000", "A-2500", "A-1000" and "n-propylbenzene".

Synthesis of Polymer Dispersant P-1

In accordance with the following scheme, a polymer dispersant P-1 was synthesized as shown below.

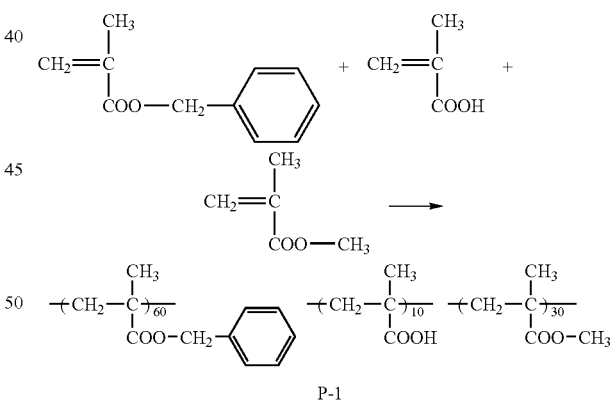

P-1

88 g of methyl ethyl ketone was put in a 1000 mL three-necked flask equipped with a stirrer and a cooling tube, and was heated to 72° C. in a nitrogen atmosphere, to which a solution of 0.85 g of dimethyl-2,2'-azobisisobutyrate, 60 g of benzyl methacrylate, 10 g of methacrylic acid, and 30 g of methyl methacrylate dissolved in 50 g of methyl ethyl ketone was added dropwise over 3 hr. After completing the dropwise addition and further allowing the mixture to react for 1 hr, a solution in which 0.42 g of dimethyl-2,2'-azobisisobutyrate was dissolved in 2 g of methyl ethyl ketone was added. The resultant mixture liquid was heated to 78° C. and maintained at that temperature for 4 hr. The obtained reaction liquid was re-precipitated twice in a great excess of hexane, and a precipitated resin was dried, thereby obtaining 96 g of a polymer dispersant P-1.

The composition of the obtained resin was confirmed by $^1$H-NMR and the weight average molecular weight (Mw) determined by GPC was 44,600. Further, its acid value was determined according to the method described in JIS standards (JISK0070: 1992, the disclosure of which is incorporated by reference herein), and was found to be 65.2 mgKOH/g.

Preparation of Pigment Dispersion C 10 parts of Pigment Blue 15:3 (PHTHALOCYANINE BLUE A220 manufactured by Dainichiseika Color & Chemicals Mfg. Co., Ltd.), 5 parts of the polymer dispersant P-1, 42 parts of methyl ethyl ketone, 5.5 parts of 1N NaOH aqueous solution and 87.2 parts of ion exchanged water were mixed, and the mixture was dispersed for 2 hours to 6 hours by using a bead mill using zirconia beads having a diameter of 0.1 mm.

Methyl ethyl ketone was removed from the resultant dispersion under reduced pressure at 55° C. and a portion of water was also removed from the resultant. Then, further, the resultant was centrifuged using HIGH SPEED REFRIGERATED CENTRIFUGE 7550 (trade name, manufactured by KUBOTA Corporation) using a 50 mL centrifuge tube at 8000 rpm for 30 minutes to collect the supernatant other than the precipitate. Thereafter, the concentration of the pigment was determined from the absorbance spectrum to turn out that a pigment dispersion C (a cyan dispersion liquid C), that is a dispersion of resin-coated pigment particles which are coated with a polymer dispersant, was obtained. The pigment dispersion C has a pigment concentration of 10.2% by mass.

Preparation of Pigment Dispersion M

A pigment dispersion M (a magenta dispersion liquid M), that is a dispersion of resin-coated pigment particles which are coated with a polymer dispersant, was prepared in the same manner as the preparation of the pigment dispersion C except that Pigment Red 122 was used in place of the pigment blue 15:3.

Preparation of Pigment Dispersion Y

A pigment dispersion Y (a yellow dispersion liquid Y) was prepared in the same manner as the preparation of the pigment dispersion C, except that a yellow pigment Pigment Yellow 74 was used in place of the Pigment Blue 15:3, and the addition amount of the polymer dispersant was changed to 4.0 g in terms of solid amount. The average particle size of dispersed pigments in the obtained pigment dispersion Y was 82 nm.

Preparation of Pigment Dispersion K

A pigment dispersion K (a black dispersion liquid K) was prepared in the same manner as the preparation of the pigment dispersion C, except that a carbon black (trade name: NIPEX160-IQ manufactured by Degussa Co.) was used in place of the cyan pigment Pigment Blue 15:3, and the addition amount of the polymer dispersant was changed to 3.0 g in terms of solid amount. The average particle size of dispersed pigments in the obtained pigment dispersion K was 130 nm.

Preparation of Self-Dispersing Polymer Particles

Synthetic Example 1

360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature inside the flask was increased to 85° C., and stirring was continued for another 2 hours. The weight average molecular weight (Mw) of the obtained copolymer was found to be 64,000 (calculated as polystyrene-equivalent value based on a measurement according to gel permeation chromatography (GPC) using three columns of TSKGEL SUPER MULTIPORE HZ-H (trade name, manufactured by Tosoh Corporation, 4.6 mmID×15 cm). The acid value of the copolymer was found to be 38.9 mgKOH/g.

Then, 668.3 g of the polymerization solution was weighed, and 388.3 g of isopropanol and 145.7 ml of a 1 mol/L NaOH aqueous solution were added to the polymerization solution, and then the temperature inside the reaction vessel was elevated to 80° C. Thereafter, 720.1 g of distilled water was added dropwise into the reaction vessel at a rate of 20 ml/min so as to form a water dispersion. The content of the reaction vessel was allowed to stand, under atmospheric pressure, at a reaction vessel inside temperature of 80° C. for 2 hours, and then 85° C. for 2 hours, and then 90° C. for 2 hours. Subsequently, the inside of the reaction vessel was depressurized, and the isopropanol, the methyl ethyl ketone, and the distilled water were removed in a total amount of 913.7 g. As a result, a water dispersion (emulsion) of self-dispersing polymer particles B-01 having a solid concentration of 28.0% by mass was obtained. The number assigned to each structural unit in the structural formula of the exemplified self-dispersible polymer (B-01) shown below indicates a mass ratio.

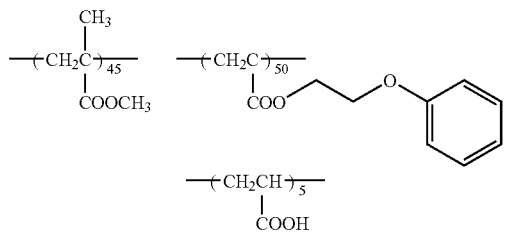

(B-01)

Preparation of Ink Composition

Ink compositions were prepared by mixing the components to achieve the formulations described in the following table, using the pigment dispersions and the dispersion of the self-dispersing polymer particles (B-01). The prepared ink compositions were each charged in a plastic disposable syringe and filtered through a PVDF 5 μm filter (trade name: MILLEX-SV, manufactured by Millipore Corporation; diameter: 25 mm) to provide final ink compositions C1, M1, Y1 and K1.

TABLE 1

| Ink Composition | C1 | M1 | Y1 | K1 |
|---|---|---|---|---|
| Cyan Pigment (prepared by using Pigment dispersion C) | 4 | | | |
| Magenta Pigment (prepared by using Pigment dispersion M) | | 4 | | |
| Yellow Pigment (prepared by using | | | 4 | |

TABLE 1-continued

| Ink Composition | C1 | M1 | Y1 | K1 |
|---|---|---|---|---|
| Pigment dispersion Y) | | | | |
| Black Pigment (prepared by using Pigment dispersion K) | | | | 4 |
| Pigment dispersant (Polymer dispersant P-1) | 2 | 2 | 2 | 2 |
| SUNNIX GP-250 (trade name, manufactured by Sanyo Chemical Industries, Ltd.) | 10 | 10 | 10 | 10 |
| Tripropylene glycol monomethyl ether | 5 | 5 | 5 | 5 |
| OLFINE E1010 (trade name, manufactured by Nissin Chemical Industry Co., Ltd.) | 1 | 1 | 1 | 1 |
| Self-dispersing polymer particles (Solid amount) | 4 | 4 | 4 | 4 |
| Water | 74 | 74 | 74 | 74 |
| Ink composition physical property: pH | 8.7 | 8.6 | 8.4 | 8.5 |
| Ink composition physical property: Surface tension (mN/m) | 34.6 | 35.2 | 35.1 | 34.8 |

The pH and the surface tension shown in Table 1 were measured as follows.

The pH was measured for each ink composition by using a pH meter WM-50EG (trade name, manufactured by DKK-TOA CORPORATION). The surface tension was measured by FASE AUTOMATIC SURFACE TENSIONMETER CBVP-Z (trade name, produced by Kyowa Interface Science Co., Ltd.).

Preparation of Reaction Liquid
Preparation of Reaction liquid 1

Reaction liquid 1 was prepared by mixing the following components.

| Malonic acid (reactant) | 22.5 g |
|---|---|
| Anionic surfactant A (10% aqueous solution) | 2.0 g |
| Diethylene glycol monobutyl ether | 20.0 g |
| Ion exchanged water | 55.5 g |

The pH of the reaction liquid 1 was measured by a pH meter WM-50EG (described above) and was found to be pH 1.10.

The surface tension of the reaction liquid 1 was measured by the Wilhelmy method at 25° C. employing a platinum plate using FASE AUTOMATIC SURFACE TENSIONMETER CBVP-Z (described above) and was found to be 38.5 mN/m.

The dynamic surface tension of the reaction liquid 1 was measured by a dynamic surface tension measuring system (trade name: BUBBLE PRESSURE TENSIOMETER MODEL BP2, manufactured by KRÜSS GmbH) at 25° C. The value γ0.1, that is the dynamic surface tension of the reaction liquid 1 measured at a surface lifetime of 100 ms, and the value γ10, that is the dynamic surface tension of the reaction liquid 1 measured at a surface lifetime of 10000 ms, are shown in the following Table 2.

The structure of the surfactant A, which was used in the reaction liquid 1, and the structure of the surfactant B, which was used in a reaction liquid 3 explained below, are shown below.

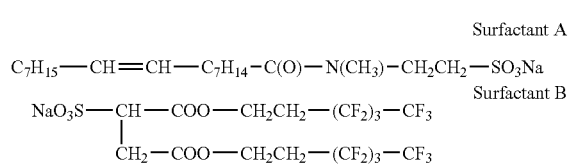

Surfactant A: $C_7H_{15}-CH=CH-C_7H_{14}-C(O)-N(CH_3)-CH_2CH_2-SO_3Na$

Surfactant B: $NaO_3S-CH(CH_2-COO-CH_2CH_2-(CF_2)_3-CF_3)-COO-CH_2CH_2-(CF_2)_3-CF_3$ Preparation of Reaction liquid 2 to 12

Reaction liquids 2 to 12 were prepared according to the formulation of the reaction liquid 1 except for changing the kind and amount of the reactant, the kind and amount of the solvent, and the kind and amount of the surfactant. The formulation and the physical property values are shown in Tables 2 and 3.

Image Recording

On an A4 size recording medium TOKUBISHI ART (trade name, manufactured by MITSUBISHI PAPER MILLS LIMITED), an image was recorded under the following image recording conditions by using the reaction liquid shown in Tables 2 and 3 and the respective ink composition.

Jetting System

Four-color single-path image formation was performed under the following conditions by using the cyan pigment ink (the ink composition C1), magenta pigment ink (the ink composition M1), yellow pigment ink (the ink composition Y1) and black ink (the ink composition K1) as ink compositions.

Application of Reaction Liquid

Just before applying the ink composition onto the recording medium, the reaction liquid shown in Tables 2 and 3 was applied, at an amount of 1.7 g/m², onto the surface of the recording medium by using a coating bar.

Subsequently, the recording medium to which the reaction liquid was applied was dried under the following conditions. The conditions for the drying of the reaction liquid were as follows.

Conditions for Drying Reaction liquid by Blow drying:
Wind speed: 15 m/s
Temperature: The recording medium was heated by a contact-type flat heater from the backside of the recording side such that the surface temperature of the recording medium reached 60° C.
Blowing area: 450 mm (Drying time: 0.7 seconds)

Application of Ink (Formations of Single-color dot image and Second color solid image)

Under the following conditions, the ink compositions were applied onto the recording medium on which the reaction liquid had been applied
Head: 1,200 dpi/20 inch-width piezo full-line heads were installed for four colors.
Amount of Ejection Droplet Volume: 2.4 pL
Drive Frequency: 30 kHz (conveyance speed of recording medium: 635 mm/sec)

A single-color dot image was formed by applying only the yellow ink composition on the recording medium.

Besides, a cyan solid image was formed by applying the cyan ink composition on the entire surface of the recording medium.

Besides, a second color image was formed by applying the cyan ink composition on the entire surface of the recording medium to form a cyan solid image and further applying the yellow ink composition on the cyan solid image.

Subsequently, the recording media to which the ink compositions were applied were dried under the following conditions.

Conditions for Drying Ink composition by Blow drying:
Wind speed: 15 m/s
Temperature: The recording medium was heated by a contact-type flat heater from the backside of the recording side such that the surface temperature of the recording medium reached 60° C.
Blowing area: 640 mm (Drying time: 1 second)

Subsequently, a heat fixation process was performed under the following conditions.

Conditions for Fixing:
Silicone rubber rollers (hardness: 50°, nip width: 5 mm)
Roller temperature: 90° C.
Pressure: 0.8 MPa Evaluation of Ink set for Inkjet recording The following evaluations were conducted using the ink compositions and the reaction liquids.

1. Evaluation of Uniformity of Solid Image

The uniformity of the cyan solid image was evaluated in accordance with the following criteria.

5: A favorable level where image is uniform and no color unevenness or white deletion is observed.
4: A favorable level overall with almost uniform image despite slight white deletion upon closer observation.
3: Practically minimum tolerable. A very small color unevenness exists, and a small white deletion is observed.
2: Practically intolerable. Sporadic streak-like white deletions and partial color unevennesses are observed.
1: Intolerable. A large stripe-like color unevenness is observed.

2. Evaluation of Uniformity of Rendered Dot Shape

For the secondary color dots, the uniformity of yellow dots rendered on a cyan solid image (secondary color dots) was observed using a DOT ANALYZER DA-6000 (trade name, manufactured by Oji Scientific Instruments) and evaluated in accordance with the following criteria.

A: A favorable level where all the dots are of uniform size and dot shape is uniform.
B: A favorable level overall despite slight variations in dot size according to location upon closer observation.
C: The minimum tolerable level for practical application, with some variations in dot size according to location and a very few slightly misshapen dots observed.
D: A problematic tolerable level for practical application, with variation in dot size according to location and dots that are clearly not spherical observed throughout the image.

TABLE 2

| Reaction Liquid No. | Aggregating Agent (Addition Amount) | Organic Solvent (Addition Amount) | Surfactant (Addition Amount) | Static Surface Tension (unit: mN/m) | Dynamic Surface Tension $\gamma 0.1$ | $\gamma 10$ | $\gamma 0.1/\gamma 10$ | Solid Image Uniformity | Dot Uniformity | Notes |
|---|---|---|---|---|---|---|---|---|---|---|
| 1 | Malonic acid (22.5%) | DEGmEE (20%) | A (0.20%) | 37 | 45.8 | 40.7 | 1.125 | 2 | C | Comp. example |
| 2 | Malonic acid (22.5%) | GP-250 (10%) | A (0.02%) | 43.6 | 56.4 | 53.1 | 1.062 | 2 | C | Comp. example |
| 3 | Malonic acid (22.5%) | GP-250 (10%) | B (0.10%) | 22.2 | 38 | 24.9 | 1.526 | 2 | B | Comp. example |
| 4 | Malonic acid (22.5%) | DEGmBE (4%) TPGmME (4%) | — | 42.0 | 46.5 | 45.5 | 1.022 | 4 | A | Present Invention |
| 5 | Malonic acid (11.3%) DL-Malic acid (14.5%) | DEGmBE (4%) TPGmME (4%) | — | 42.2 | 46.5 | 45.2 | 1.029 | 5 | A | Present Invention |
| 6 | Malic acid (14.5%) Meta-phosphoric acid (8.7%) | DEGmBE (2%) TPGmME (6%) | — | 41.2 | 46.5 | 45.5 | 1.022 | 4 | A | Present Invention |
| 7 | Malic acid (20.2%) Phosphoric acid (12.2%) | DEGmBE (2%) TPGmME (6%) | — | 42.7 | 47.7 | 46.2 | 1.032 | 4 | A | Present Invention |

TABLE 3

| Reaction Liquid No. | Aggregating Agent (Addition Amount) | Organic Solvent (Addition Amount) | Surfactant (Addition Amount) | Static Surface Tension (unit: mN/m) | Dynamic Surface Tension $\gamma 0.1$ | $\gamma 10$ | $\gamma 0.1/\gamma 10$ | Solid Image Uniformity | Dot Uniformity | Notes |
|---|---|---|---|---|---|---|---|---|---|---|
| 8 | Malonic acid (11.3%) DL-Malic acid (14.5%) | DEGmBE (6%) TEGmBE (2%) | — | 41.9 | 48.2 | 46.5 | 1.037 | 5 | A | Present Invention |
| 9 | Malonic acid (11.3%) DL-Malic acid (14.5%) | DEGmBE (4%) DPG (4%) | — | 42.8 | 47.2 | 45.9 | 1.028 | 4 | A | Present Invention |
| 10 | Malonic acid (11.3%) DL-Malic acid (14.5%) | GP-250 (7.5%) PE-62 (0.5%) | — | 41.5 | 48.5 | 46.5 | 1.043 | 5 | A | Present Invention |
| 11 | Maleic acid (26.0%) | DEGmBE (4%) | — | 42.6 | 46.9 | 45.4 | 1.033 | 4 | A | Present Invention |

TABLE 3-continued

| Reaction Liquid No. | Aggregating Agent (Addition Amount) | Organic Solvent (Addition Amount) | Surfactant (Addition Amount) | Static Surface Tension (unit: mN/m) | Dynamic Surface Tension | | | Solid Image Uniformity | Dot Uniformity | Notes |
|---|---|---|---|---|---|---|---|---|---|---|
| | | | | | $\gamma 0.1$ | $\gamma 10$ | $\gamma 0.1/\gamma 10$ | | | |
| 12 | Malonic acid (11.3%) DL-Malic acid (14.5%) | TPGmME (4%) GP-250 (1%) DEGmBE (7%) | — | 40.4 | 43.0 | 42.2 | 1.019 | 4 | A | Present Invention |

The abbreviations of the solvents which were used in the above Examples are as follows:

DEGmEE: diethylene glycol monoethyl ether
DEGmBE: diethylene glycol monobutyl ether
TEGmBE: triethylene glycol monobutyl ether
DPG: dipropylene glycol
TPGmME: tripropylene glycol monomethyl ether
GP-250: polyoxypropylene glyceryl ether (SUNNIX GP-250: described above)
PE-62 polyoxyethylene polyoxypropyleneglycol (trade name: NEWPOL PE-62, manufactured by Sanyo Chemical Industries Ltd.)

As is evident from Tables 2 and 3, with Comparative reaction liquids 1-3, there were many color unevenness in the solid image and occasional variations in the shape of secondary color dots were observed. In contrast, when the reaction liquid having the configuration of the invention was used, the uniformity of the solid image and the uniformity of secondary color dot images were favorable, and it is clear that stable image rendering properties can be provided thereby.

All publications, patent applications, and technical standards mentioned in this specification are herein incorporated by reference to the same extent as if each individual publication, patent application, or technical standard was specifically and individually indicated to be incorporated by reference

What is claimed is:

1. An ink set for inkjet recording comprising:
   an aqueous ink composition comprising a pigment; and
   a reaction liquid comprising a reactant that produces an aggregate when contacted with the aqueous ink composition,
   the static surface tension of the reaction liquid being 40 mN/m or higher, and
   the dynamic surface tension $\gamma 0.1$ being from 40 mN/m to 50 mN/m and the ratio $\gamma 0.1/\gamma 10$ being from 1.01 to 1.10, in which the dynamic surface tension of the reaction liquid at a surface lifetime of 100 ms and 10000 ms is $\gamma 0.1$ and $\gamma 10$, respectively, according to the maximum bubble pressure technique,
   wherein the pH of the reaction liquid is from 0.5 to 2.5.

2. The ink set of claim 1, wherein the static surface tension of the reaction liquid is from 40 mN/m to 50 mN/m.

3. The ink set of claim 1, wherein the ratio $\gamma 0.1/\gamma 10$ is from 1.01 to 1.08.

4. The ink set of claim 1, wherein the content of the reactant in the reaction liquid is from 15% by mass to 30% by mass with respect to the total amount of the reaction liquid.

5. The ink set of claim 1, wherein the reaction liquid comprises an organic solvent, and the content of the organic solvent in the reaction liquid is from 1% by mass to 30% by mass with respect to the total amount of the reaction liquid.

6. The ink set of claim 5, wherein the content of the organic solvent in the reaction liquid is from 5% by mass to 15% by mass with respect to the total amount of the reaction liquid.

* * * * *